United States Patent
Muranishi

(10) Patent No.: US 7,363,565 B2
(45) Date of Patent: Apr. 22, 2008

(54) METHOD OF TESTING APPARATUS HAVING MASTER LOGIC UNIT AND SLAVE LOGIC UNIT

(75) Inventor: Koji Muranishi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 243 days.

(21) Appl. No.: 11/055,629

(22) Filed: Feb. 11, 2005

(65) Prior Publication Data

US 2005/0240849 A1  Oct. 27, 2005

(30) Foreign Application Priority Data

Apr. 13, 2004  (JP)  ............................. 2004-117945

(51) Int. Cl.
*G01R 31/28* (2006.01)
*G06F 11/00* (2006.01)

(52) U.S. Cl. ........................................ 714/735; 714/736

(58) Field of Classification Search ...................... None
See application file for complete search history.

(56) References Cited

U.S. PATENT DOCUMENTS

| 6,505,317 B1 * | 1/2003 | Smith et al. ................ 714/738 |
| 6,784,686 B2 * | 8/2004 | Nishida et al. ............ 324/765 |
| 2004/0103357 A1* | 5/2004 | Nishida et al. ............ 714/738 |

FOREIGN PATENT DOCUMENTS

| JP | 2002140311 | 5/2002 |
| WO | WO 01/73459 A2 * | 10/2001 |

* cited by examiner

*Primary Examiner*—Phung M. Chung
(74) *Attorney, Agent, or Firm*—Volentine & Whitt, P.L.L.C.

(57) ABSTRACT

An apparatus which is tested includes a master logic unit and a slave logic unit. The testing method includes accessing a virtual slave logic unit by a test pattern which includes an address for accessing and an expected value of a waiting time, returning a response value from the virtual slave logic unit which is accessed by the address after lapse of the waiting time, and comparing the expected value and the response value.

4 Claims, 8 Drawing Sheets

AhbRead(htrans, hburst, hsize, hadder, hrdata, hresp, nwait)
  (1)     (2)      (3)     (4)      (5)      (6)     (7)

Fig. 7  Prior Art

| ADDRESS | WAITING TIME |
|---------|--------------|
| 000-099 | 0 |
| 100-199 | 1 |
| 200-299 | 2 |
| 300-399 | 3 |
| 400-499 | 4 |
| 500-599 | 5 |

AhbRead(noseq, single, 32, 0000, 0000, ok, 0)

→ transfer task with "0" waiting time to the virtual slave logic unit

AhbRead(noseq, single, 32, 1000, 0000, ok, 1)

→ transfer task with "1" waiting time to the DUT

AhbRead(noseq, single, 32, 0008, 0000, ok, 2)

→ transfer task with "2" waiting time to the virtual slave logic unit

AhbRead(noseq, single, 32, 100c, 0000, ok, 3)

→ transfer task with "3" waiting time to the DUT

Fig. 10  Prior Art

METHOD OF TESTING APPARATUS HAVING MASTER LOGIC UNIT AND SLAVE LOGIC UNIT

CROSS REFERENCE TO RELATED APPLICATION

A claim of priority under 35 U.S.C. §119 is made to Japanese Patent Application No. 2004-117945, filed Apr. 13, 2004, which is herein incorporated by reference in its entirety for all purposes.

BACKGROUND OF THE INVENTION

1. Field of the Invention

The present invention relates to a method of testing apparatus which includes a master logic unit and a slave logic unit.

2. Description of the Related Art

When an apparatus which includes a master logic unit and slave logic units, each of which is connected by a bus, is manufactured, a test for verifying that operation of the slave logic units is operated by the master logic unit correctly is needed. Such a technique of the testing is disclosed in Japanese Patent Laid-Open 2002-140311.

The test is performed by checking a response which is output from a DUT (Device Under Test). The response is output from the DUT in response to a test pattern from a virtual master logic unit. The DUT is one of the slave logic units to be tested. An example of the conventional testing is described by referring to FIG. 6 and FIG. 7.

FIG. 6 is a block diagram showing a structure of a conventional testing apparatus. The structure includes a test pattern storing unit 101, a virtual master logic unit 102, a transfer checker 103, a DUT 104, a virtual slave logic unit 105, a default slave logic unit 106, and an on-chip bus 107. A test pattern which is stored in the test pattern storing unit 101 is written by task texts of Verilog-HDL. Verilog-HDL is a kind of programming language. If the on-chip bus 107 is used for AMBA-AHB (Advanced Microcontroller Bus Architecture (registered trademark of ARM Ltd)—Advanced High-performance Bus), the test pattern is described by a form which is shown in FIG. 7. The test pattern which is shown in FIG. 7 is called a transfer task.

The form of the transfer task includes a type of task (1) which shows a read mode or a write mode and parameters (2) to (8). The parameter includes a type of transferring (2), a type of bursting (3), a transferring bit size (4), an address of the transferring direction (5), an expected read data which is output from the slave logic unit (6), an expected response (OKAY shows a success of a bus transferring, ERROR shows a failure of the bus transferring, and RETRY shows a retry of the bus transferring) (7), and an expected waiting time (8).

The transfer task includes the parameter of nwait for setting the waiting time as shown in FIG. 7. The transfer checker 103 checks the on-chip bus 107 and judges whether the DUT is operated correctly or not, by comparing the expected value which is transferred from the virtual master unit 102 and response which is transferred from the DUT 104.

The waiting time which is included in the expected value is varied for respective types of the slaves or respective types of transferring.

The default slave logic unit 106 returns a response, when any of the other slaves do not return any response.

Next, an operation of the testing is described. First, the virtual master logic unit 102 receives the transfer task from the test pattern storing unit 101, and outputs the transfer task to the on-chip bus 107. This operation is called as a bus transfer. The expected value which includes read data and the waiting time in the transfer task is output from the virtual master logic unit 102 to the transfer checker 103.

Then, the slave logic unit (DUT) 104 which is accessed by the transfer task returns the response.

Then, the transfer checker 103 checks the on-chip bus 107, and compares the expected value in the transfer task with the response from the DUT 104.

After receiving the response from the DUT 104, the virtual master logic unit 102 transfers a next transfer task to the on-chip bus 107.

Next, the test pattern is described below. Each of the slave logic units must respond correctly, even if the responding is performed after the other slave logic unit is responded with predetermined waiting time n (n=1, 2, . . . , ). For checking this responding operation, the virtual slave logic unit 105 has been used. The virtual slave logic unit 105 includes a table which has a relationship between the address which is accessed by the virtual master logic unit 102 and the waiting time as shown in FIG. 8. The waiting time is decided based on the table. For example, when the virtual master logic unit 102 accesses the address range of 000-099 of the table, the waiting time is "0" clock cycles and the virtual slave logic unit 105 responds without waiting as shown in FIG. 9. Alternatively, when the virtual master logic unit 102 accesses the address range of 100-199 of the table, the waiting time is "1" clock cycles and the virtual slave logic unit 105 responds after "1" clock cycles waiting. When the virtual master logic unit 102 accesses the address range of 500-599 of the table, the waiting time is "5" clock cycles and the virtual slave logic unit 105 responds after "5" clock cycles waiting.

An example of the test pattern is described in FIG. 10. In this example, the virtual master logic unit 102 outputs a bus transfer which requires a responding with "0" waiting time to the virtual slave logic unit 105. Then, the virtual master logic unit 102 outputs a bus transfer which requires a responding with "1" waiting time to the DUT. Then, the virtual master logic unit 102 outputs a bus transfer which requires a responding with "2" waiting time to the virtual slave logic unit 105. Then, the virtual master logic unit 102 outputs a bus transfer which requires a responding with "3" waiting time to the DUT.

For checking the operation of the DUT after accessing at the various waiting times, the test pattern which includes the various waiting times is required. However, in the conventional method, the number of the patterns is dependent on the number of the waiting times "n". That is, if a lot of waiting times "n" such as ten thousands or more is needed, a lot of test patterns are needed. Therefore, if a lot of waiting times are needed, the checking for all waiting times is difficult.

SUMMARY OF THE INVENTION

Accordingly, in one aspect of the present invention, a method of testing a master logic unit or a slave logic unit without depending on waiting time is provided. An apparatus which is tested includes a master logic unit and a slave logic unit. The testing method includes accessing a virtual slave logic unit by a test pattern which includes an address for accessing and an expected value of a waiting time, returning a response value from the virtual slave logic unit which is accessed by the address after lapse of the waiting time, and comparing the expected value and the response value.

BRIEF DESCRIPTION OF THE DRAWINGS

FIG. 7 shows a form of a transfer task.

FIG. 10 shows a test pattern which is used for a conventional testing method.

DETAILED DESCRIPTION OF THE PREFERRED EMBODIMENTS

Figure 1:
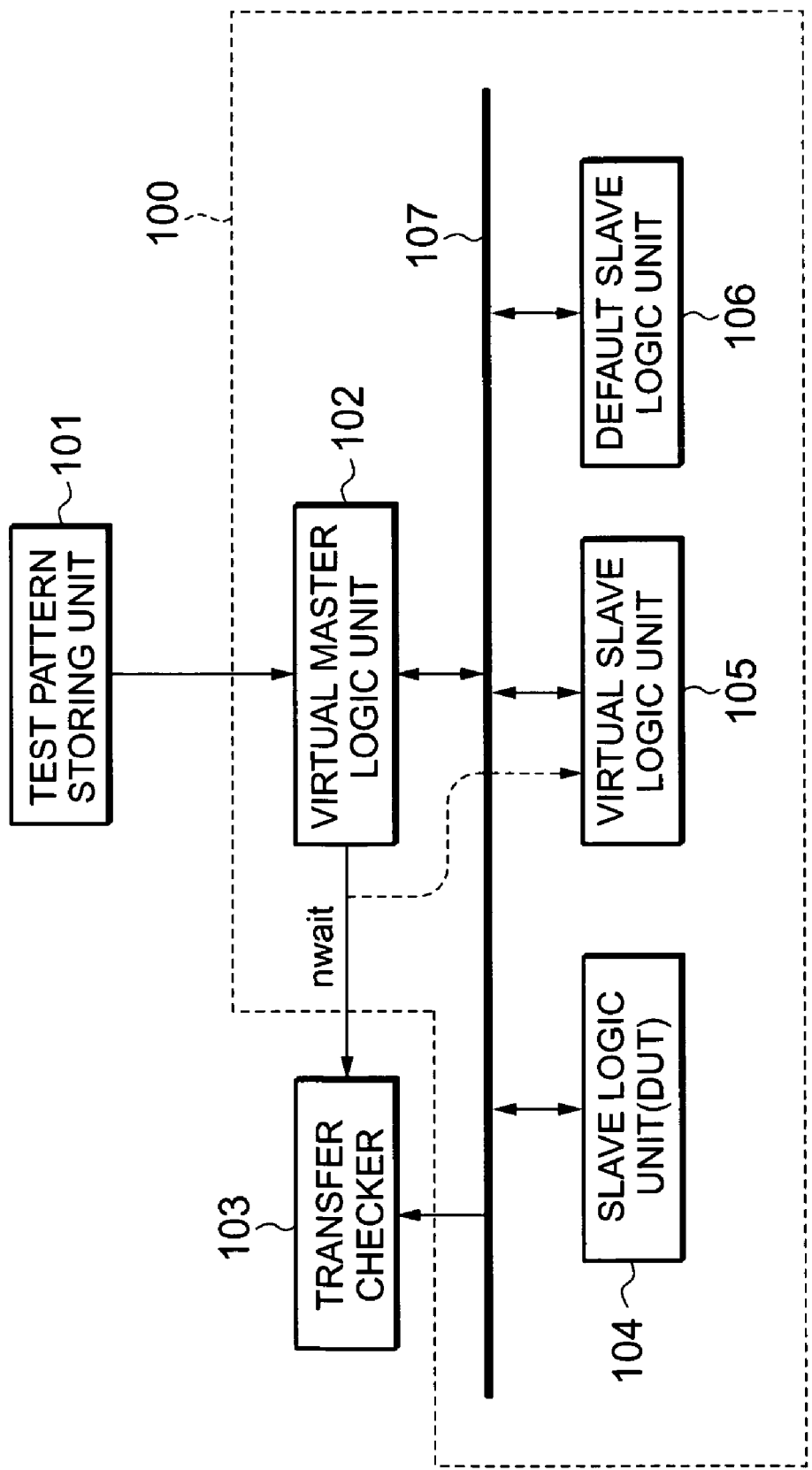
FIG. 1 is a block diagram showing a structure of a testing apparatus of a present invention.

A method of testing an apparatus which has a master logic unit and a slave logic unit according to preferred embodiments of the present invention will be explained hereinafter with reference to the accompanying figures. In order to simplify the explanation, like elements are given like or corresponding reference numerals. Dual explanations of the same elements are avoided.

A testing structure includes a semiconductor chip 100, a test pattern storing unit 101, and a transfer checker 103 as shown in FIG. 1. A virtual master logic unit 102 and a virtual slave logic unit 105 are used as a normal master logic unit and a normal slave logic unit, after the testing. An external device can be used as the virtual master logic unit 102. A slave logic unit (DUT) 104 and a default slave logic unit 106 are also included on semiconductor chip 100.

Figure 2:
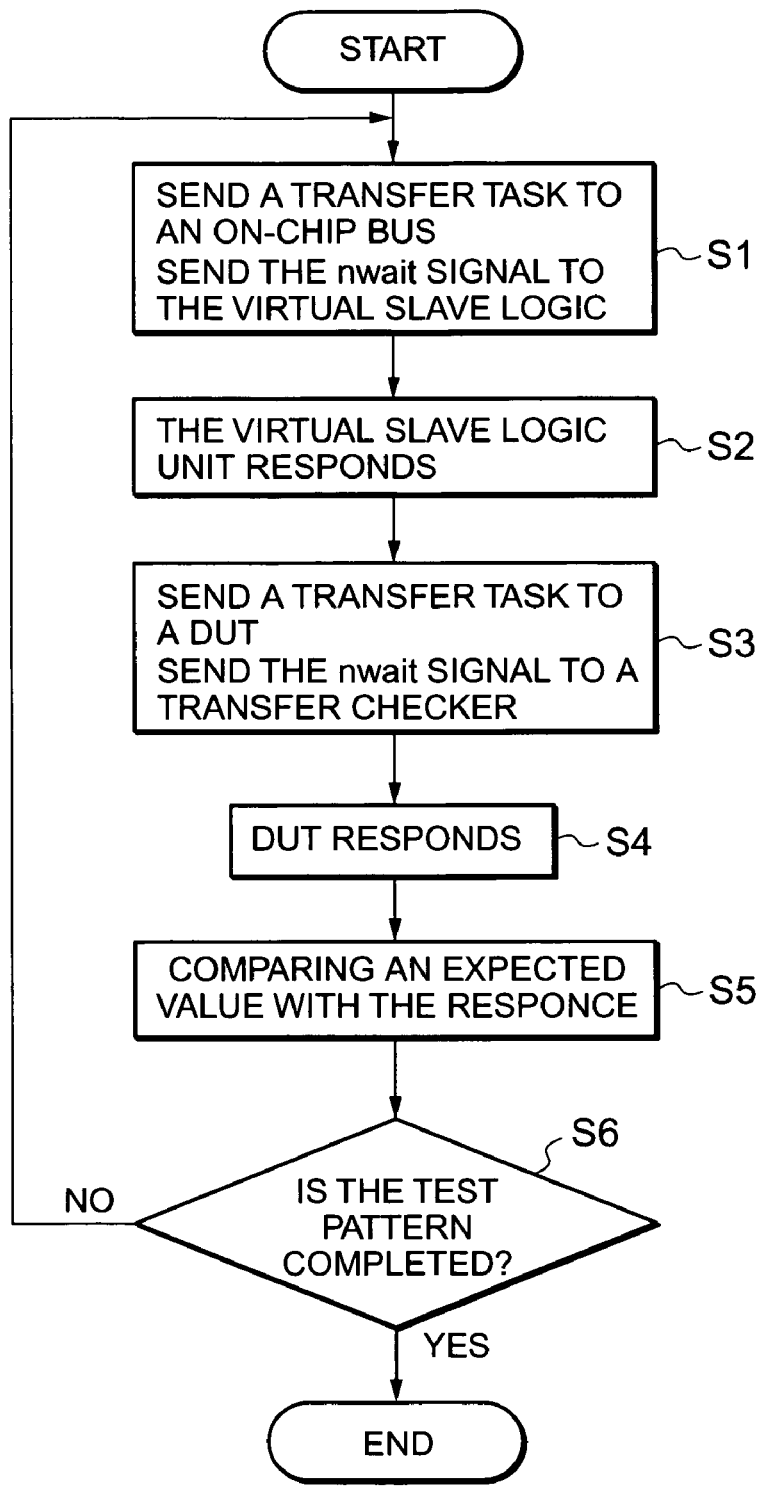
FIG. 2 is a flowchart showing an operation of testing of the present invention.

Then, a testing operation is described by referring to FIG. 2.

The virtual master logic unit 102 has received thereto a transfer task from the test pattern storing unit 101, and sends the transfer task to the on-chip bus 107. Therefore, the virtual master logic unit 102 sends an expected value which includes a reading data and a waiting time to the virtual slave logic unit 105 (step S1). Then, the virtual slave logic unit 105 returns a response after the waiting time which is defined by an nwait signal (step S2).

After the virtual master logic unit 102 has received thereto the response, the virtual master logic unit 102 has received thereto a next transfer task from the test pattern storing unit 101, and then the transfer task is sent to the slave logic unit (DUT) 104 via the on-chip bus 107. Also, the virtual master logic unit 102 sends an expected value which is described in the transfer task to the transfer checker 103 (step S3). The expected value includes a reading data and a waiting time. The slave logic unit (DUT) 104 which is accessed by the transfer task returns a response to the on-chip bus 107 (step S4).

The transfer checker 103 checks the on-chip bus 107, and compares the expected value which is described in the transfer task with the response from the DUT 104 (step S5).

The above operations are repeated with varying of the waiting time (steps S1 to S6). When all of the transfer tasks are sent from the test pattern storing unit 101, the testing operation for the slave logic unit (DUT) 104 is completed. And then, a next slave is set as the DUT and the same testing operation which is described above is performed to the next slave.

Figure 3:
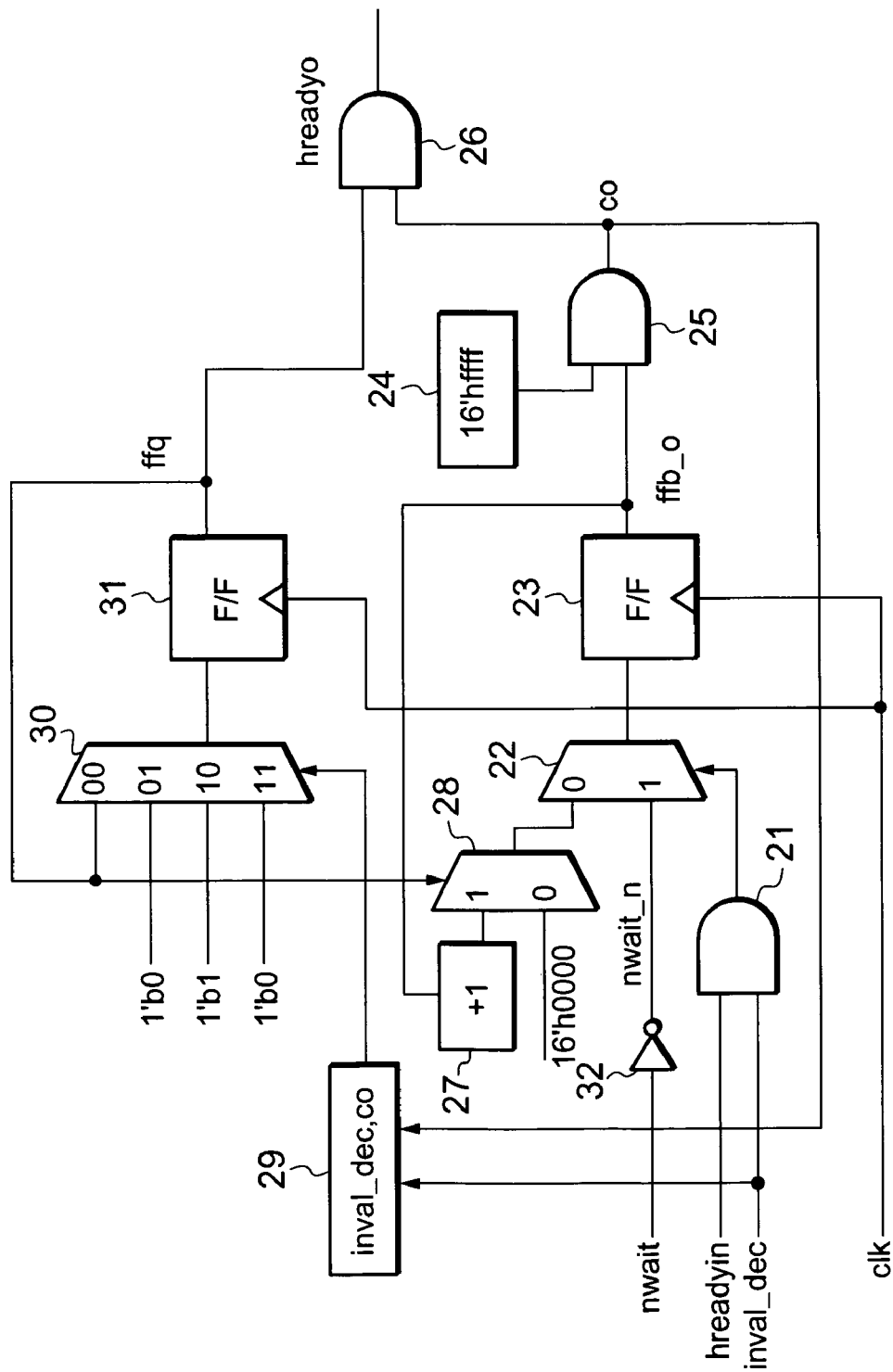
FIG. 3 is a circuit diagram showing a function enhancement circuit of the present invention.

In this testing operation, the virtual slave logic unit 105 returns the response after the waiting time which is described in the nwait signal. That is, the response is returned after a number of clock cycles which corresponds to the waiting time. Therefore, the virtual slave logic unit 105 includes a counting circuit as shown in FIG. 3. The counting circuit includes AND gates 21, 25, and 26, flip-flop circuits 23 and 31, selector circuits 22, 28, and 30, an adder circuit 27, a constant storing unit 24, a selector controller 29, and an inverter 32.

Figure 4:
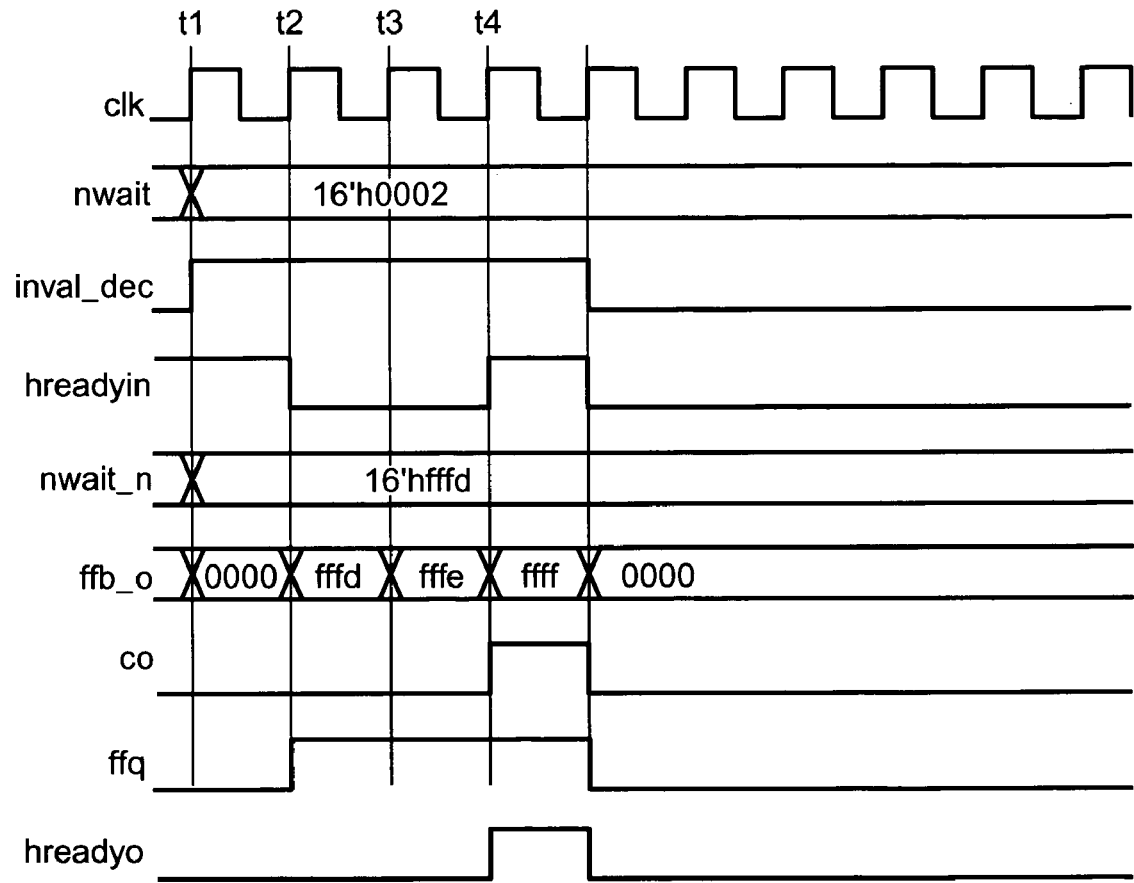
FIG. 4 is a timing chart showing an operation of the function enhancement circuit of the present invention.

A signal of inval_dec shows the virtual slave logic unit 105 is accessed. The signal of inval_dec is obtained by decoding the address in the transfer task from the virtual master logic unit 102. A signal of hreadyin is sent from the DUT 104 or the default slave logic unit 106, when the DUT or the default slave logic unit responds. An operation of the counting circuit is described by referring to FIG. 4. In FIG. 4, the waiting time of the example is two clock cycles.

The signal of inval_dec is turned to a "1" level in response to the accessing of the virtual slave logic unit 105 at "t1". An output of the AND gate 21 is turned to the "1" level in response to the "1" level of the signal of inval_dec. The selector 22 selects a signal of nwait_n (equal to ffff-n=ffff-2) which is output from the inverter 32 in response to the "1" level of the output signal from the AND gate 21, and sens the nwait_n signal to the flip-flop 23 at "t2". Since an output level of the AND gate 25 is a "0" level at "t2", an output level of the selector controller 29 is "10" and the selector 30 outputs a "1'b1". As a result, an output ffq of the flip-flop 31 becomes the "1" level. The selector 28 selects an output signal from the adder circuit 27 for adding "+1" to an output ffb_o of the flip-flop 23, in response to the "1" level of the output signal of the flip-flop 31. Then, the signal of hreadyin is turned to the "0" level. In response to the "0" level of the signal of hreadyin, the selector 22 selects the output of the selector 28, and the flip-flop 23 counts up until the output ffb_o of the flip-flop 23 becomes the constant ffff which is stored in the constant storing unit 24 at "t3". An output signal hreadyo of the AND gate 26 is turned to the "1" level at the same time of the flip-flop 23 is overflowed at "t4". The "1" level of the signal hreadyo shows the end of responding of the virtual slave logic unit 105. In this embodiment, since the flip-flop 23 is a 16 bit structure, 65535 waiting time can be set. However, more waiting time can be set by increasing a number of bits in the flip-flop 23.

In this embodiment, the waiting time is sent to the virtual slave logic unit 105 directly. Therefore, various test patterns which include various waiting times can be made easily. As a result, various tests can be performed to the DUT easily. The waiting time is described in the expected value in the transfer task of the conventional device. Therefore, the waiting time which is used in the conventional device is used for this embodiment without changing a format.

In the first embodiment, the virtual slave logic unit is used for testing the DUT. However, if the device has the default slave logic unit, the function of the virtual slave logic unit can be taken to the default slave logic unit.

Figure 5:
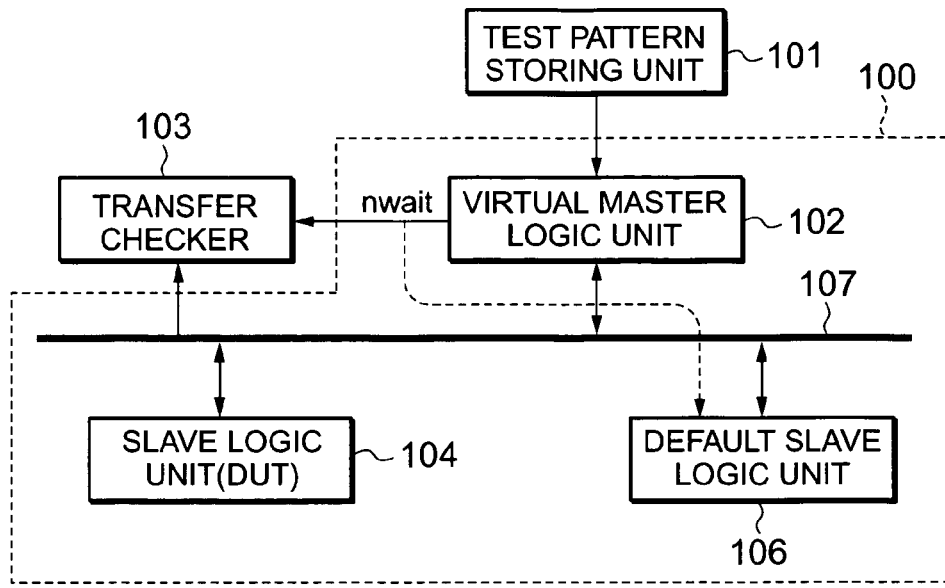
FIG. 5 is a block diagram showing a structure of a testing apparatus of another embodiment of the present invention.
Figure 6:
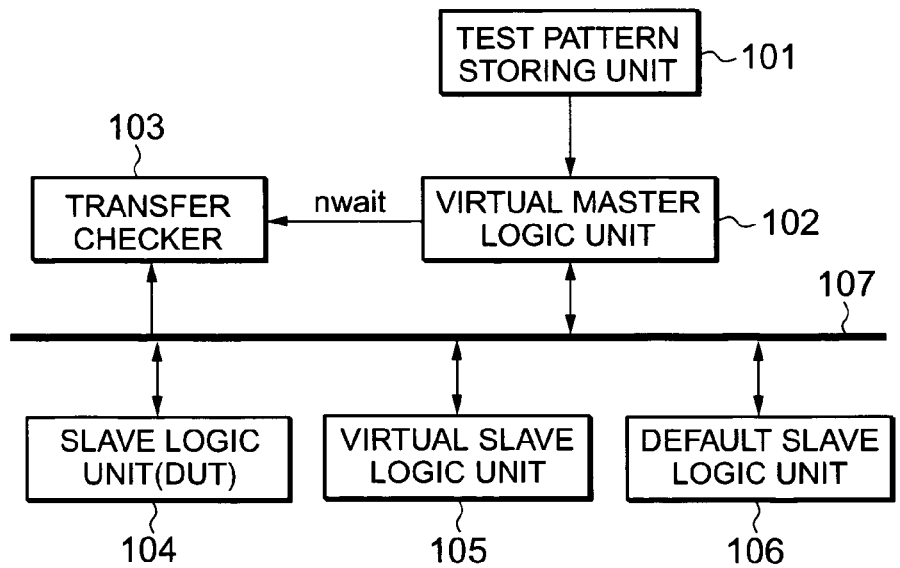
FIG. 6 is a block diagram showing a structure of a conventional testing apparatus.
Figures 8, 9:
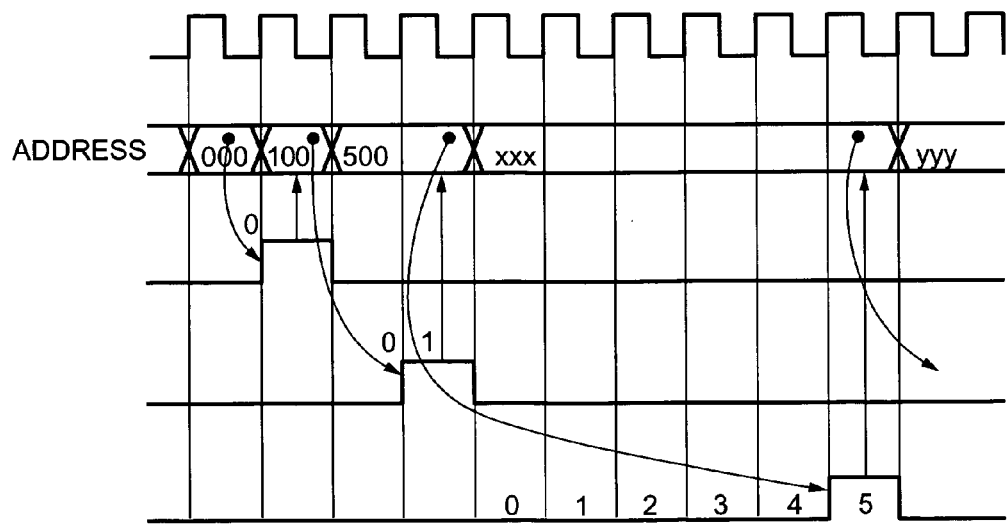
FIG. 8 shows a table of relationship between an address and a waiting time which is provided in a conventional virtual slave logic unit.
FIG. 9 is a timing chart showing a responding operation of the conventional virtual slave logic unit.

A testing structure of a second embodiment which includes the default slave logic unit with the function of the virtual slave logic unit 105 is described as shown in FIG. 5. In this embodiment, the virtual slave logic unit 105 is not included, and the nwait signal is output from the virtual master logic unit 102 to the default slave logic unit 106. The default slave logic unit 106 includes a counter circuit which has the same structure as the counter circuit of the first embodiment.

The default slave logic unit 106 returns a response for an address that any slave logic units has not responded. That is, the default slave logic unit 106 returns a response for any address other than the address that the DUT responds to. Since the nwait signal is input to the default slave logic unit 106, the default slave logic unit 106 can return with the set waiting time.

In this embodiment, the waiting time is sent to the default slave logic unit 106 directly. Therefore, various test patterns which include various waiting times can be made easily. As a result, various tests can be performed to the DUT easily. The waiting time is described in the expected value in the transfer task of the conventional device. Therefore, the waiting time which is used in the conventional device is used for this embodiment without changing a format.

While the preferred form of the present invention has been described, it is to be understood that modifications will be apparent to those skilled in the art without departing from the spirit of the invention. The scope of the invention is to be determined solely by the following claims.

What is claimed is:

1. A method of testing an apparatus which includes a master logic unit and a slave logic unit, comprising:
   sending a test pattern which includes an expected value and a waiting time to a virtual slave logic unit and a transfer checker;
   returning a response value from the virtual slave logic unit after a lapse of the waiting time;
   comparing the expected value and the response value from the virtual slave logic unit; and
   accessing the slave logic unit by the test pattern after the response value is returned by the virtual slave logic unit.

2. The method of claim 1, wherein the master logic unit and the slave logic unit are connected by a bus, and wherein a virtual master logic unit sends the test pattern to the bus.

3. The method of claim 1, wherein the virtual slave logic unit detects a number of clock cycles which correspond to the waiting time in the test pattern.

4. The method of claim 1, further comprising a default slave logic unit which returns a response when the slave logic unit does not return any response, wherein the default slave logic unit is used as the virtual logic unit.

* * * * *